US006963353B1

(12) United States Patent
Firestone

(10) Patent No.: US 6,963,353 B1
(45) Date of Patent: Nov. 8, 2005

(54) NON-CAUSAL SPEAKER SELECTION FOR CONFERENCE MULTICAST

(75) Inventor: Scott Firestone, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 139 days.

(21) Appl. No.: 10/439,147

(22) Filed: May 14, 2003

(51) Int. Cl.[7] .................................................. H04N 7/14
(52) U.S. Cl. ............................... 348/14.09; 348/14.08; 348/14.11
(58) Field of Search .......................... 348/14.01–14.09, 348/14.1, 14.11, 14.12, 14.13; 379/202.01; 709/204; 370/260, 261; 345/753

(56) References Cited

U.S. PATENT DOCUMENTS

| | | | |
|---|---|---|---|
| 4,054,908 A | 10/1977 | Poirier et al. ................... 358/85 |
| 5,557,725 A | 9/1996 | Ansberry et al. ............ 395/153 |
| 5,710,591 A | 1/1998 | Bruno et al. ................... 348/15 |
| 5,764,901 A | 6/1998 | Skarbo et al. .......... 395/200.34 |
| 5,990,933 A * | 11/1999 | Ozone et al. ............. 348/14.09 |
| 5,991,277 A | 11/1999 | Maeng et al. ................ 370/263 |
| 6,008,838 A | 12/1999 | Iizawa .......................... 348/15 |
| 6,025,870 A | 2/2000 | Hardy .......................... 348/15 |
| 6,285,661 B1 | 9/2001 | Zhu et al. ..................... 370/260 |
| 6,288,740 B1 | 9/2001 | Lai et al. ........................ 348/15 |
| 6,404,745 B1 | 6/2002 | O'Neil et al. ................ 370/260 |
| 6,466,248 B1 | 10/2002 | Spann et al. ............. 348/14.08 |
| 6,480,584 B2 * | 11/2002 | Duran et al. .............. 379/93.21 |
| 2002/0071027 A1 | 6/2002 | Sugiyama et al. ....... 348/14.09 |
| 2002/0191072 A1 | 12/2002 | Henrikson ............... 348/14.08 |

* cited by examiner

*Primary Examiner*—Melur Ramakrishnaiah
(74) *Attorney, Agent, or Firm*—Baker Botts L.L.P.

(57) ABSTRACT

A method for non-causal speaker selection is provided. In accordance with a particular embodiment of the present invention the method includes receiving a plurality of video streams at a multipoint control unit, each of the plurality of video streams being associated with a respective endpoint of a multipoint conference. A plurality of audio streams may also be received at the multipoint control unit, and each audio stream may be associated with a respective one of the video streams. The audio streams are buffered in respective audio buffers, and the video streams are buffered in respective video buffers. First video data is copied from the video buffers to obtain a low latency video stream for distribution to active conference participants. In a particular embodiment, second video data may be copied from the video buffers to obtain a high latency video stream for distribution to passive conference participants, the high latency video streams being delayed in time with respect to the low latency video stream.

36 Claims, 4 Drawing Sheets

NON-CAUSAL SPEAKER SELECTION FOR CONFERENCE MULTICAST

TECHNICAL FIELD OF THE INVENTION

The present invention relates in general to the field of packet-based communication networks and, in particular, to a system and method of non-causal speaker selection for a conference multicast.

BACKGROUND OF THE INVENTION

Historically, telecommunications have involved the transmission of voice and fax signals over a network dedicated to telecommunications, such as the Public Switched Telephone Network (PSTN) or Private Branch Exchange (PBX). Similarly, data communications between computers have been historically transmitted on a dedicated data network, such as a Local Area Network (LAN) or a Wide Area Network (WAN). Currently, telecommunications and data transmissions are being merged into an integrated communication network using technology such as Voice over Internet Protocol (VoIP). Since many LANs and WANs transmit computer data using Internet Protocol (IP), VoIP uses this existing technology to transmit voice and fax signals by converting these signals into digital data and encapsulating the data for transmission over an IP network. Traditional communication networks often support multipoint conferences between a number of participants using different communication devices. A Multipoint Control Unit (MCU) is used to couple these devices, which allows users from distributed geographic locations to participate in the conference. The conference may be audio only (e.g. teleconference), or video conferencing/broadcasting may be included. A single MCU may be used to accommodate thousands of participants in a multipoint conference.

When supporting three or more endpoints, MCUs typically support one of two layout formats; (i) continuous presence; or (ii) voice-activated. The MCU creates a continuous presence format by tiling together a scaled-down version of video streams from some or all endpoints into a grid that is displayed at some or all endpoints. However, it is often desirable to view a participant in full screen mode, in which case voice-activated switching (VAS) is used.

MCUs in voice-activated switching mode may send all participants a copy of a full-resolution video screen from the participant who is speaking the loudest at any given time. In this embodiment, the loudest speaker never sees him/herself. In order to prevent spurious switching, the MCU typically implements a hysteresis algorithm which only switches to a new speaker after that speaker has been speaking for at least a certain duration of time (e.g., one or two seconds). Accordingly, a hysteresis delay is introduced into the system, which requires that video is switched to a new speaker only after that speaker has been talking for some fixed period of time (e.g., one or two seconds).

An MCU which hosts an interactive videoconference can also multicast a copy of the conference to many receive-only viewers. Such a copy may also be recorded to a disk server by using a highly scalable multi-task streaming mechanism.

SUMMARY OF THE INVENTION

In accordance with a particular embodiment of the present invention, a method for non-causal speaker selection includes receiving a plurality of video streams at a multipoint control unit, each of the plurality of video streams being associated with a respective endpoint of a multipoint conference. A plurality of audio streams are also received at the multipoint control unit, and each audio stream is associated with a respective one of the video streams. The audio streams are buffered in respective audio buffers and the video streams are buffered in respective video buffers. First video data is copied from the video buffers to obtain a low latency video stream for distribution to active conference participants. In a particular embodiment, second video data may be copied from the video buffers to obtain a high latency video stream for distribution to passive conference participants, wherein the high latency video stream is delayed in time with respect to the low latency video stream. In accordance with another embodiment of the present invention, the first audio data may be used to detect a new speaker of the multipoint conference. In this embodiment, the second video data may be switched based upon detection of the new speaker.

Technical advantages of particular embodiments of the present invention include a system and method for non-causal speaker selection that includes a video stream for distribution to passive conference participants only, the video stream being delayed in time with respect to a video stream that is delivered to active conference participants. This delay allows for processing of the passive conference participant video stream, such that speaker selection of this video stream is accomplished according to detection of a new speaker at an earlier point in time. Switching in this manner allows the passive conference participant to view a new speaker at a point in time just prior to the time at which the new speaker begins speaking.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
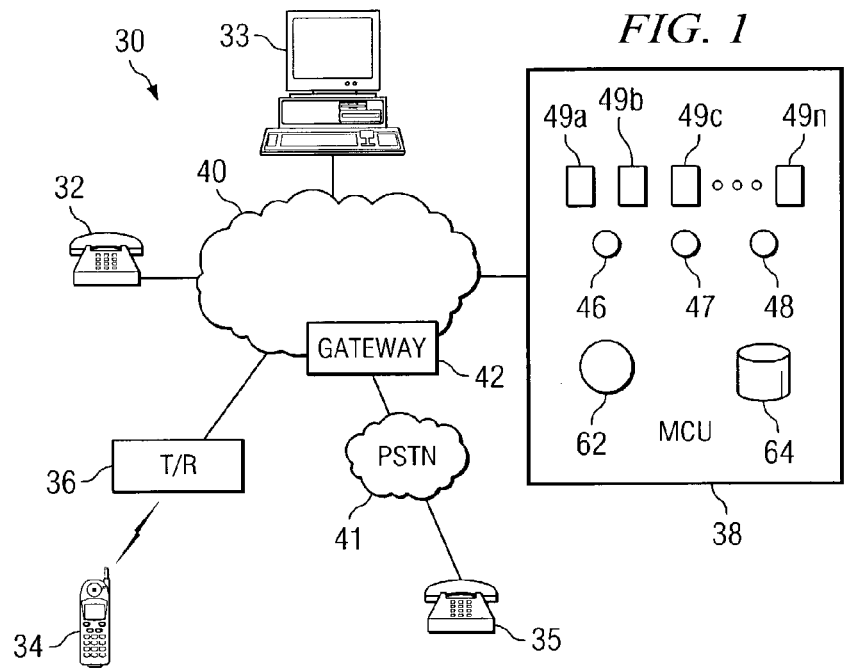
FIG. 1 illustrates a communication network in accordance with a particular embodiment of the present invention.

FIG. 1 illustrates a communication system 30 including a plurality of endpoints 32–35 having the ability to establish communication sessions with each other, and/or a multipoint control unit (MCU) 38. Such communication sessions may be established using communication networks 40, 41, and/or additional endpoints, components or resources coupled with communication networks 40 and/or 41. MCU 38 accommodates multipoint conferences between and among endpoints 32–35. MCU 38 includes a plurality of digital signal processors (DSPs) 46–48, and a plurality of communication ports 49*a*–49*n*.

In accordance with the present invention, a system(s) and method(s) are provided that improve the timing of video switching for voice-activated switching conferences that are multicast or recorded. The resulting conference may appear to viewers of the recorded conference to have been edited, since video switching is accomplished before or more closely in time to the time at which the audio from a new speaker begins playing.

The multipoint conference may be a Meet Me Conference call. A Meet Me Conference call is an arrangement by which a user can dial a specific, pre-determined telephone number and enter a security access code to join a conference with other participants. The user is automatically connected to the conference through a conference bridge. Conference participants may call in at a preset time or may be directed to do so by a conference coordinator. Meet Me Conferences may be set up through a teleconferencing service provider, generally with the capability to conference thousands of participants in a single conference call. However, other types of multipoint conferences may be accommodated, within the teachings of the present invention.

Endpoints 32–35 may be any combination of hardware, software, and/or encoded logic that provide communication services to a user. For example, endpoints 32–35 may include a telephone, a computer running telephony software, a video monitor, a camera, or any other communication hardware, software, and/or encoded logic that support the communication of packets of media using communication network 40. In the illustrated embodiment, endpoints 32–34 include an Internet telephone, a personal computer and wireless handset, respectively. A wireless transmitter/receiver 36 couples endpoint 34 with communication network 40. Endpoints 32–35 may also include unattended or automated systems, gateways, other intermediate components, or other devices that can establish media sessions. Although FIG. 1 illustrates four endpoints 32–35, communication system 30 contemplates any number and arrangement of endpoints 32–35 for communicating media. For example, the described technologies and techniques for establishing a communication session between or among endpoints 32–35 may be operable to establish a multipoint conference between more than two endpoints 32–35.

MCU 38 may include any bridging or switching device used in support of multipoint conferencing, including videoconferencing. In various embodiments, MCU 38 may include hardware, software, and/or embedded logic. MCU 38 may be configured to support more than twenty-eight conference endpoints, simultaneously. MCU 38 may be in the form of customer provided equipment (CPE, e.g., beyond the network interface) or may be embedded in a wide area network (WAN). Examples of multipoint conference unit standards are defined in ITU-T H.323, with H.231 describing conference control functions.

Although specific communication networks 40 and 41 are illustrated in FIG. 1, the term "communication network" should be interpreted as generically defining any network capable of transmitting audio and/or video telecommunications signals, data and/or messages. Communication network 40 may be any computer or communication network capable of coupling two or more endpoints 32–35, for example, communication. In the illustrated embodiment, communication network 40 is a wide area network (WAN) that enables communication between a plurality of endpoints distributed across multiple cities and geographic regions, and communication network 41 is a public switched telephone network (PSTN). However, communication networks 40 and/or 41 may be one or more networks, including the Internet, the public switched telephone network, local area networks (LANs), global distributed networks such as intranets, extranets, or other form of wireless or wireline communication networks. Generally, communication networks 40 and 41 provide for the communication of packets, cells, frames, and/or other portions of information (generally referred to as packets) between and among endpoints 32–35. Communication paths for the communication of such packets may include any combination of routers, hubs, switches, gateways (e.g., gateway 42) or other hardware, software, or embedded logic implementing any number of communication protocols that allow for the exchange of packets in communication system 30.

In a particular embodiment, communication network 40 employs communication protocols that allow for the addressing or identification of endpoints 32–35 coupled to communication network 40. For example, using Internet protocol (IP), each of the components coupled together by communication network 40 in communication system 30 may be identified in information directed using IP addresses. In this manner, communication network 40 may support any form and combination of point-to-point, multicast, Unicast, or other techniques for exchanging media packets among components in communication system 30.

In the illustrated embodiment, MCU 38 includes a processor 62 and memory 64. Processor 62 may be a microprocessor, controller, or any other suitable computing device or resource. Memory 64 may be any form of volatile or nonvolatile memory including, without limitation, magnetic media, optical media, random access memory (RAM), read only memory (ROM), removable media, or any other suitable local or remote memory component. A user of communication system 30 may configure MCU 38 to accommodate a future multipoint conference, using processor 62 and memory 64. When a user or network administrator schedules or otherwise establishes a multipoint conference, MCU 38 prompts the administrator to identify the number of participants and a unique identifier associated with each participant.

Any given communication session between two of endpoints 32–35 will include the transfer of packets across one or more communication paths, that couple endpoints 32–35 and/or MCU 38 across communication network 40. Such paths may include any combination of network components, gatekeepers, call managers, routers, hubs, switches, gateways, endpoints, or other hardware, software, or embedded logic implementing any number of communication protocols that allow for the exchange of packets in communication system 30.

Network 40 may be directly coupled to other IP networks including, but not limited to, the Internet. Since IP networks share a common method of transmitting data, telecommunication signals may be transmitted between telephony devices located on different, but interconnected, IP networks. In addition to being coupled to other IP networks, network 40 may also be coupled to non-IP telecommunication networks for example, through the use of gateway 42. For example, network 40 is coupled to Public Switched Telephone Network (PSTN) 41. PSTN 41 includes switching stations, central offices, mobile telephone switching offices, pager switching offices, remote terminals, and other related telecommunications equipment that are located across the country.

IP networks transmit data (including voice and video data) by placing the data in packets and sending each packet individually to the selected destination. Unlike a circuit-switched network (like PSTN 41), dedicated bandwidth is not required for the duration of a call or fax transmission over IP networks. Instead, each telephony device sends packets across the network as they become available for transmission. This feature makes bandwidth available for other data when voice or fax data is not being transmitted.

The technology that allows telecommunications to be transmitted over an IP network may be referred to as Voice over Internet Protocol (VoIP). In the illustrated embodiment, endpoints 32–34 and MCU 38 are IP telephony devices. IP telephony devices have the capability of encapsulating a user's voice (or other inputs) into IP packets so that the voice can be transmitted over network 40. Similarly, IP telephony devices 32–34 have the capability of capturing and encapsulating video into IP packets so that the video can be transmitted over network 40. Conversely, IP telephony devices 32–34 have the capability of receiving audio or video IP packets from the network 40 and playing the audio or video data to a user.

A codec (coder/decoder) at the endpoint converts the voice, video or fax signals generated by the users of the telephony devices from analog media signals into digital form. The codec may be implemented either in software or as special-purpose hardware in the endpoints. In the case of an IP telephone, as the user speaks into the handset, the codec converts the analog voice signals into digital data. The digitally encoded data is then encapsulated into IP packets so that it can be transmitted over network 40. Conversely, another codec at the receiving endpoint converts the digital data into analog media for the users of the telephony devices. In the case of an IP telephone, digital data from IP encapsulated packets are received from the network 40. The codec at the receiving endpoint converts the digital voice, video or fax data from the network 40 into analog media to be played to the users of the telephony devices.

Gateway 42 accomplishes several things. For example, gateway 42 may convert analog or digital circuit-switched data transmitted by PSTN 41 to packetized data transmitted by network 40, and vice-versa. When voice data packets are transmitted from network 40, gateway 42 retrieves the data contained in the incoming packets and converts this digital data to the analog or digital format used by the PSTN trunk to which gateway 42 is coupled. Since the digital format for voice transmissions over an IP network is often different than the format used on the digital trunks of PSTN 41, the gateway provides conversion between these different digital formats, which is referred to as transcoding. Gateway 42 also translates between the VoIP call control system and other signaling protocols (e.g., SS7, T1, ISDN, etc.), used in PSTN 41.

For voice transmissions from PSTN 41 to network 40, the process is reversed. In a particular embodiment, gateway 42 takes the incoming voice transmission (in either analog or digital form) and converts it into the digital format used by network 40. The digital data is then encapsulated into IP packets and transmitted over network 40.

Figure 2:
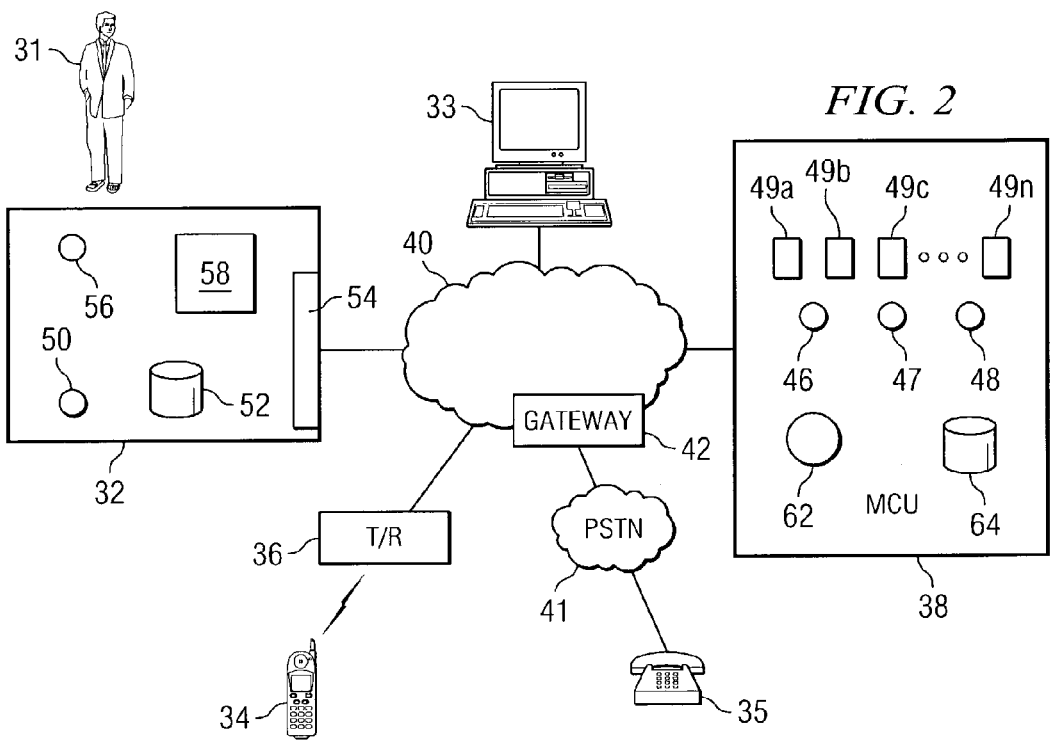
FIG. 2 illustrates a multipoint conference communication session among users of endpoints of the communication network of FIG. 1, in accordance with a particular embodiment of the present invention.

FIG. 2 illustrates a multipoint communication conference between endpoints 32–35 using MCU 38. Since endpoints 32–35 include similar components and functionality, it should be recognized that all endpoints coupled with network 40 may include the components and functionality described with regard to endpoint 32. Endpoint 32 includes a processor 50, memory 52, a network interface 54, and a codec 56. Endpoint 32 also includes a user interface 58, which may include a microphone, video camera, speaker, keyboard, and/or video display. In accordance with another embodiment, user interface 58 may be coupled with components that include a microphone, video camera, speaker, keyboard, and/or video display, rather than incorporating such components into endpoint 32. Endpoints 33–35 include similar or identical components to endpoint 32, having similar functionality.

During a communication session between endpoints 32, 33, 34, 35 and/or 38, user 31 generates analog audio (e.g., speech) that is captured by a microphone at user interface 58. The analog audio is transmitted to codec 56 where the analog audio is digitized for transmission across network 40. The digitized audio is transmitted to network interface 54 and transmitted across network 40 as a plurality of packets that include the digitized audio. A stream of such packets may be referred to as a digital audio stream.

The digital audio stream is received at network interfaces, and transmitted to codecs associated with the other endpoints and/or MCU 38, where the digital audio stream is decoded and transmitted to other users. User interfaces 58 associated with the other endpoints play the decoded audio stream in an analog format, to such users. Although delays may be encountered in the transmission of the analog audio stream received at the user interfaces until it is played by the user interfaces to the users, the communication is considered "real-time".

In many instances, user interface 58 will also capture video generated by user 31 at a video camera coupled with or integral to user interface 58. The analog video captured by user interface 58 is transmitted to codec 56, digitized, and transmitted to user interfaces 58, packetized, transmitted across network 40 as a digital video stream, received at network interfaces associated with the other networks, decoded by a respective codec and played to users by respective user interfaces. Delays may be encountered during this process, but the communication of video is considered "real-time". In general, and for reasons generally apparent to those skilled in the art, the delays associated with the transmission of video are typically greater than delays associated with the transmission of audio.

In the illustrated embodiment, MCU 38 acts as an intermediary during the multipoint communication conference, and collects all audio and/or video streams transmitted by the endpoints, and distributes such streams to the participants of the multipoint conference. Typically, for Internet Protocol (IP) telephony applications, conferences are "hosted" by a MCU. During a voice-activated switching multipoint conference, there are generally two types of participants. Interactive participants, or endpoints, actively participate in the multipoint conference and their associated endpoints both receive and transmit information to be included in the conference. Such participants may be referred to as "active" participants or endpoints. Non-interactive endpoints, or participants occupy a more passive role in which their associated endpoints receive the multicast stream, but do not transmit audio or video that is included in the multipoint conference. Such participants may be referred to as "passive" participants or endpoints. Non-interactive endpoints may include "receive-only viewers." Non-interactive endpoints may also include endpoints, disk, or subsystems that record the multipoint conference for future viewing. An example of such a system includes a disk server that records the multicast stream.

The one-way multicast stream that is delivered to receive-only viewers (and/or recorded), can afford to have more latency than multicast streams that are being transmitted to interactive endpoints, because real-time interaction is not required for such recipients of the one-way stream. In accordance with the teachings of the present invention, the MCU can improve the timing of the apparent video switching in the multicast stream by using a non-causal VAS algorithm that "looks into the future" by more than the amount of hysteresis delay. The non-causal algorithm may eliminate or diminish the hysteresis delay that occurs when an interactive participant begins to speak.

In order to generate the higher latency voice activated switching video stream for the one-way, non-interactive endpoint, and in accordance with a particular embodiment of the present invention, the MCU maintains a large buffer level of size B seconds for the streams received by the MCU. The level of B may be set such that it is larger than the voice-activated hysteresis delay. With this higher buffer level, the MCU may be operable to remove the oldest video data from the video buffers and perform voice-activated switching among the video streams based on the most recently received audio data in the audio buffers. In this manner, the MCU can determine which video stream to use by looking B seconds into the "future" of the audio stream. In other words, the MCU is using data that is B seconds more recent than the video that is being processed for transmission to the endpoints.

In order to generate the low-latency, voice-activated switching video streams for the interactive endpoints, the MCU makes a copy of video data in the video buffers that is A seconds old. A may be selected such that it is smaller than B, and provide just enough delay to absorb, diminish or eliminate jitter. The MCU only makes a copy of such data; the MCU leaves the data in the buffer so that it can be removed later at buffer level B. The MCU generates the low latency voice-activated switching streams by doing voice-activated switching among the video streams that are A seconds old, based upon the most recently received audio data in the audio buffers.

The one-way stream that is generated can be either multicast or Unicast. Multicast is often used to gain bandwidth efficiency, however, there is no reason that unicast cannot be used. The MCU does not need to keep relatively larger audio buffer sizes, only relatively larger video buffers sizes. However, in order to achieve lip synchronization, the one-way receivers (e.g., endpoints) are operable to buffer the audio stream, because the video stream is typically received later than the audio stream.

In compiling the one-way, multicast, voice-activated switching stream by looking far ahead in the audio streams to determine which speaker is about to begin speaking, the non-causal voice activated switching can cause the video to switch early, for example a fraction of second before the new participant starts talking (as viewed by the one-way recipient), which will provide higher quality. This will give the conference the appearance of having been edited, since the MCU will appear to have known in advance which speaker was about to begin speaking.

In accordance with a particular embodiment of the present invention, the non-causal algorithm may utilize additional storage space with respect to previous multipoint videoconference systems, since the input buffer of video from each endpoint will typically be larger. However, the teachings of the present invention and the non-causal voice activated switching can benefit from any amount of additional buffering. Even if a particular MCU has only a small amount of extra memory to spare, the video switching will be improved. Moreover, the voice-activated switching algorithm of the present invention may dynamically reduce or increase the amount of extra buffering, depending upon how much available memory is allocated or freed up on the MCU.

If the MCU adjusts the buffers while staying locked onto a single participant, an imperfection in the video stream may appear. However, this imperfection may be avoided, since the MCU will have the ability to adjust the buffers of non-active participants only.

In order to account for any additional memory requirements, a conference scheduler may take into account the additional buffer resources required on all multicasting MCUs in a network, that will use the teachings of the present invention. Furthermore, load balancing may be used to avoid running out memory on any particular MCU. Moreover, many MCU's have memory available at any given time, since a MCU is more likely to be limited by the amount of processing power, as opposed to the amount of buffer memory available. It is likely that only a few conferences hosted on a given MCU at a given time will be multicast, so additional consumption should be minimal.

In accordance with another embodiment of the present invention, the teachings may be used and applied to a local interactive video conference anytime delay is added to the audio stream relative to the video stream, such as when a jitter buffer is used for audio but not video. In accordance with this embodiment, rather than sending the video stream immediately (e.g., too soon relative to the audio), the same non-causal voice-activated algorithm may be applied which improves video switching performance, while at the same time delaying the video until it is synchronized with the audio.

Figure 3:
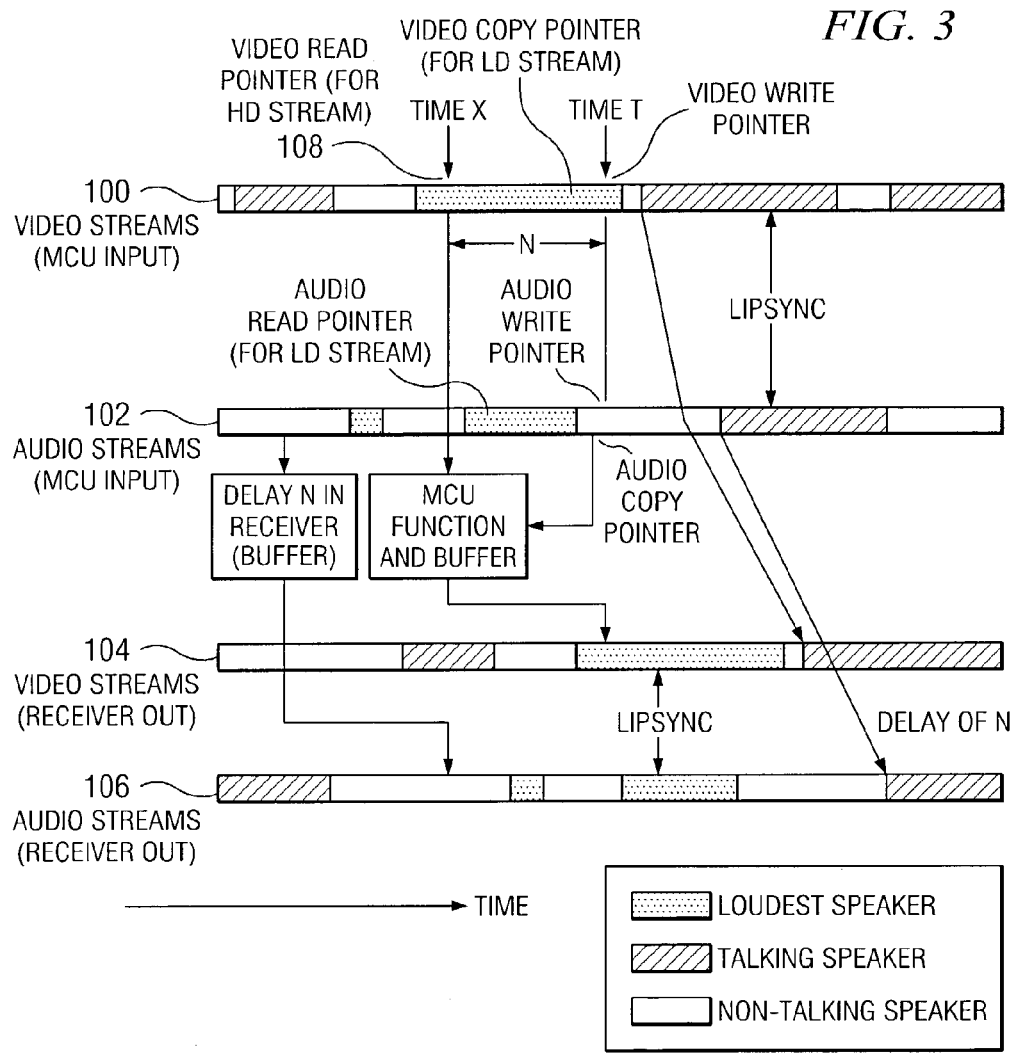
FIG. 3 illustrates video input and output streams, and audio input and output streams of a multipoint control unit, in accordance with aspects of the present invention.

FIG. 3 illustrates a method for non-causal speaker selection, in accordance with a particular embodiment of the present invention. More specifically, FIG. 3 illustrates input streams 100 and 102, and output streams 104 and 106, of an MCU that is hosting a multipoint conference. In this embodiment, streams 100 and 104 are video streams, and streams 102 and 106 are audio streams. The video input stream is processed at time X, based upon what it sees seconds into the future in the audio stream at time T. Accordingly, this represents non-causal selection wherein one stream (video) is purely being transformed upon an other, and the other (audio) is being used to determine how to do the transformation. In other words, data is taken from video stream 100 and processed depending on what the MCU sees in the audio stream 102 at time T, which is in the "future."

In order to accomplish this, the MCU will buffer N seconds worth of data in the video stream before it begins to transmit output stream 104. This is done since the MCU looks N seconds into the future of the audio stream to determine how to process the video stream at time X. Time T is referred to as the "future", because it is ahead of time X in the buffer, and processing of the stream is occurring at time X. In effect, a read pointer coming out of the audio stream is located at current time at time T, so time T may be referred to as "real time" or the present time. Time X represents the time in the past which occurred N seconds before time T (or, X=T−N). What is being sent is data that is transformed (e.g., combined) at time X, which occurred N seconds ago, based on the data that is in the audio stream 102 at the present time T. As a result, the output of the MCU will be a video stream that is transformed and also has been delayed by time N. Accordingly, the MCU creates a latency of N seconds.

Video stream 104 and audio stream 106 illustrate what is occurring at the receiver. The receiver receives the transformed and delayed video stream. However, the receiver must maintain the ability to maintain lip synchronization between the video stream and the audio stream; in order to do so, the receiver delays the audio stream by the same amount that the video stream was delayed. In a sense, the function in the sender (e.g., MCU) delays the video stream which requires a buffer in the sender and the receiver must correspondingly delay the audio to maintain lip synchronization, which requires a buffer in the receiver. In the illustrated embodiment, each of the buffers (sender, receiver) will be equal to N seconds. In this manner, when the receiver (e.g., endpoint) receives the delayed video stream and the delayed audio stream it can play both streams so that they are lip synchronized. Accordingly, the correspondence between video and audio that was originally established before any processing must also have an equal correspondence between video and audio before and after all processing if the receiver is going to display those streams on the video screen and through the audio speakers.

Figure 4:
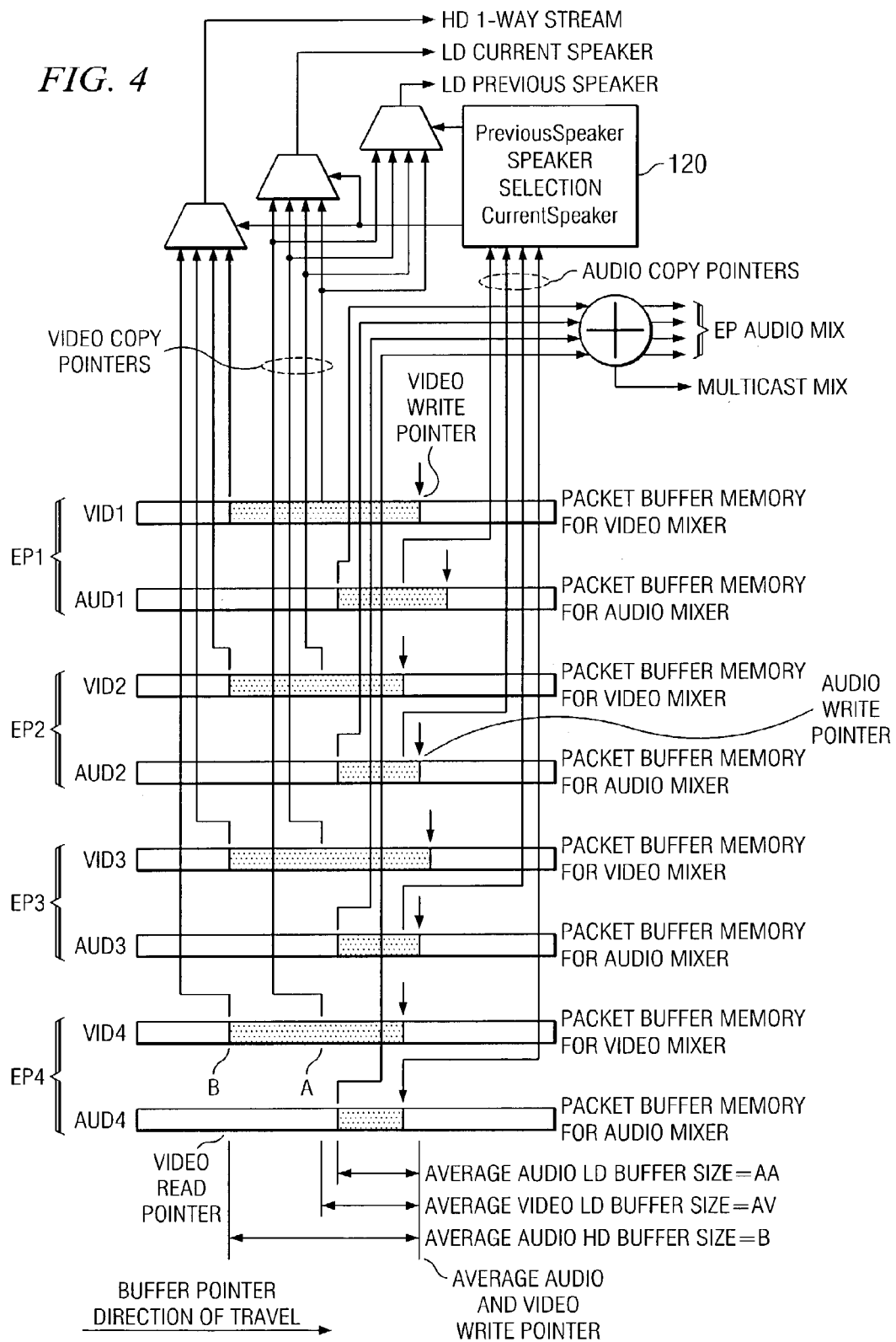
FIG. 4 illustrates a method for non-causal speaker selection and illustrates additional aspects of the present invention.

FIG. 4 illustrates a method for non-causal voice activated switching in accordance with a particular embodiment of the present invention. The method illustrated in FIG. 4 may be implemented in accordance with an algorithm, or logic embodied in media that allows a system of the present invention to perform the method(s) described within this specification.

FIG. 4 illustrates a particular embodiment of the teachings of the present invention, using buffer pointers. Four endpoints EP1–EP4 are illustrated, and each one transmits both audio streams (Aud1-4, respectively) and video streams (Vid1-4, respectively). The horizontal measures alongside of each endpoint EP1-4 of FIG. 4 illustrate first in, first out (FIFO) packet buffer memory, or "buffers" of the MCU. The MCU includes an audio processing unit and a video-processing unit, for processing of the audio and video of the multipoint conference.

There are four buffers in the audio-processing unit, and data is received by the MCU and written into these buffers. Each audio stream Aud1-4 buffer includes a respective write pointer (pointing to the audio buffer), that indicates the location of the buffer where data is written as it is received. These pointers may be referred to as FIFO write pointers. Each audio stream Aud1–4 buffer also includes a read pointer (pointing away from the audio buffer), which represents the location from which data is read. These pointers may also be referred to as FIFO read pointers.

Delay is introduced between the write pointer and the read pointer. The delay constitutes a buffer that provides protection against underflow of data packets. Each write pointer will be at a different location along the buffer as time progresses, since each of the audio streams may have network jitter which causes packets to arrive earlier, or later, with respect to other packets. On average, the write pointers will progress in time horizontally at a somewhat uneven pace. However, all the pointers will have an average location which may be referred to as the average write pointer location.

Data is removed from the buffers at a more even pace, since the MCU removes data from the buffer at generally regular intervals. In general, system design will focus upon minimizing the size of the audio buffer in order to minimize endpoint to endpoint latency in the system. FIG. 4 represents a "snapshot" in time regarding the operation of the MCU. Low delay buffer sizes may be selected so that underflow happens less than one second out of a million seconds, for example.

In the audio-processing unit, data is removed from each of the buffers at the FIFO read pointer locations, summed together, and sent to all the endpoints. Audio processing unit 100 also includes a speaker selection module 122 that establishes speaker selection criteria by extracting the most recent data that has been written into the audio buffer. "Speaker selection" refers to the ability to determine the person who is presently speaking, and the immediately previous speaker, in order to make decisions regarding the switching of video that is transmitted to the endpoints. This allows the viewers to see video that is associated with the current speaker.

Data is removed from the audio buffers at a point that is as recent as possible, but each buffer must have data at that point in the buffer. In the illustrated embodiment, for example, Aud4 buffer is the laggard, since it has received data the least recently. Each of Aud1–3 have received data more recently that Aud4, as is evident from the fact that the read pointer of Aud4 is further to the left than all others. Therefore, in this case, the speaker selection module of the audio processing unit will create speaker selection criteria based on the time corresponding to the write pointer of the audio stream from EP4. Data will be extracted from each of the other buffers (Aud1–3) at the same time. In this manner, the speaker selection module receives data from each stream and corresponding data (received at the same time) from each stream must correspond to the same point in time.

The speaker selection module creates the selection for both the previous speaker and the current speaker and sends that data to the video-processing unit. This allows the video-processing unit to create a voice-activated switched video stream.

In accordance with the teachings of the present invention, the video-processing unit creates three output streams. The first video output stream LD-PS is a low delay stream of the previous speaker for the current speaker. The second video output stream LD-CS is a low delay stream of the current speaker. The third video output stream HD is a high delay stream for one-way recipients (e.g., passive participants) on the endpoints (e.g., receive and/or record, only).

In this embodiment, streams for each of the low delay video outputs are taken from a read pointer that corresponds to read pointer location A. In this particular example, location A corresponds with the read pointer location for audio. Read pointer location A may be selected so that underflow between the write pointer and the A read pointer is minimized. It should be recognized that the read pointer for audio and low delay video of any given endpoint may be different, within the teachings of the present invention. This is done since the video-processing unit may experience a high degree of jitter, and may need to buffer up more video in a steady state situation in order to absorb the jitter and prevent underflow. It is preferable that the low delay video streams utilize types of buffer sizes that are as small as practicable, while still minimizing the probability of underflow.

Video output stream HD, the high delay-one way stream includes data removed from the FIFO buffer at read pointer B, which is a time "in the past" with respect to the low delay video streams LD-PS and LD-CS. Accordingly, the video processing unit of the MCU is able to switch among the video streams corresponding to times "in the past", based upon speaker selection information which determines active speaker characteristics at a time that is more "recent," with respect to the video processing stream HD. In this manner, the video processing unit can counteract the hysteresis delay caused by the speaker selection unit, since it looks further into the future than the hysteresis delay of the speaker selection unit.

In accordance with a particular embodiment of the present invention, the data for the low delay video streams LD-PS and LD-CS is copied only, and it is not removed. This is in contrast to previous systems that remove data from the buffer, as it is read, on a FIFO basis.

Video data is copied twice from each data buffer. The data is removed (or at least copied) to create the low-delay video stream, although it is left in the buffer. Next, it is removed from the buffer to create the high delay video stream for one-way recipients. This video data is used by the non-causal speaker selection portion of the video-processing unit.

Figure 5A:
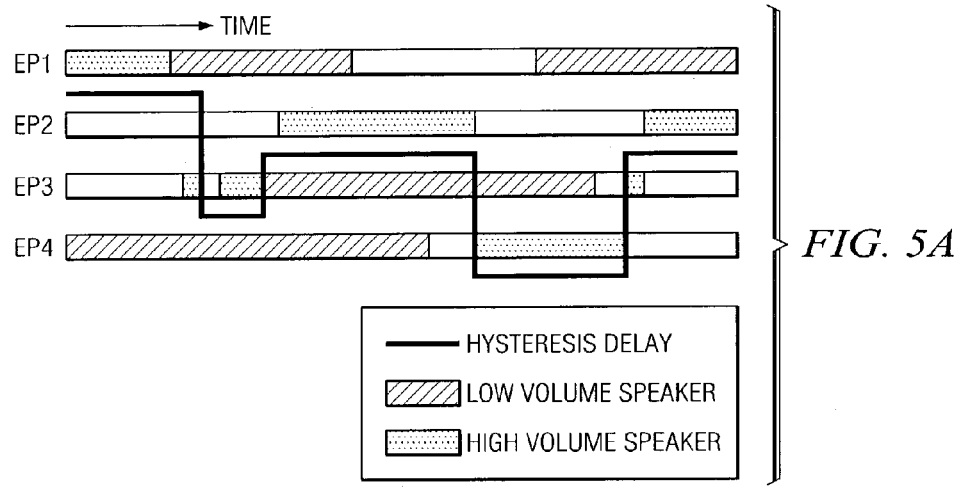
FIG. 5 illustrates a comparison of one type of voice-activated switching to one type of non-causal voice-activated switching that incorporates aspects of the present invention.
Figure 5B:
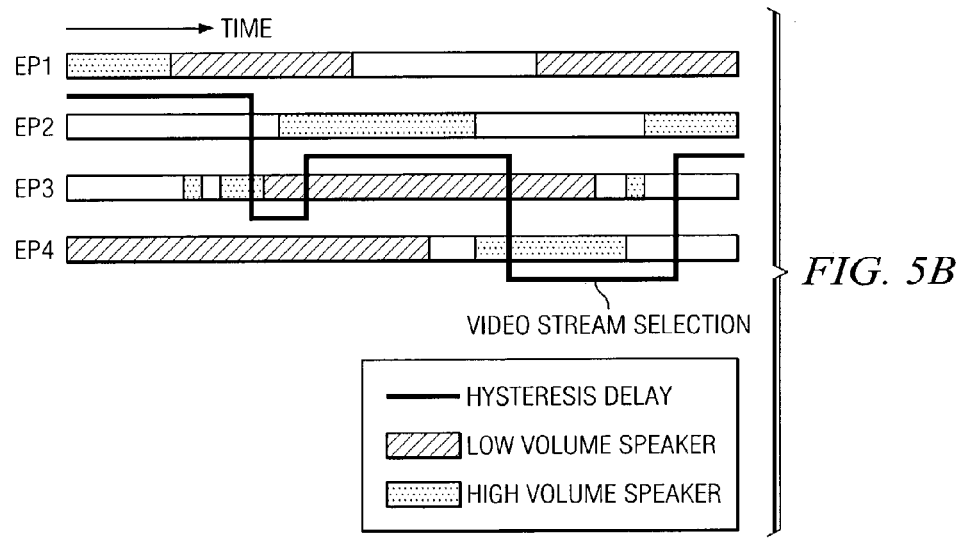

FIG. 5 illustrates two diagrams that help demonstrate advantages of particular embodiments of the present invention. Diagram B illustrates the operation of a typical voice-activated switching component, and represents four endpoints EP1–EP-4 and the audio "loudness" of each endpoint. White portions represent silence, hatched is medium loud, and dotted corresponds to the loudest speaker. In accordance with Diagram B, speaker selection will not indicate a new speaker until that new speaker has been talking for at least two seconds, in order to avoid spurious switching. For example, at endpoint EP3 there is a period of time where the speaker coughs, creating a very small duration of time where that endpoint is the loudest speaker. The speaker selection algorithm will not identify EP3 as the new speaker since EP3 was not the loudest speaker for at least two seconds. As shown in FIG. 5, the video stream selection is done according to a two-second delay, and a speaker will only appear at a minimum of two seconds after the speaker begins speaking.

Diagram A illustrates a video stream selection technique that incorporates aspects of the present invention. Diagram A illustrates a non-causal speaker selection algorithm. By "looking into the future", the speaker selection algorithm switches to the person who is about to begin speaking (with respect to the video stream transmitted to the endpoints) at approximately the time the speaker begins speaking. In fact, the switch may be made fractions of a second to whole seconds before the speaker begins speaking. At a minimum, this technique allows the video to be switched ahead of the time that it would have been switched according to standard VAS MCUs.

To the one-way recipient, it appears as though the stream has been edited, since the recipient will be given the impression that they're viewing the stream in "real-time." This is advantageous for recorded copies of the multipoint conference, since no editing will be required to achieve this effect.

Additional References Include:

ITU-T Recommendation H.323: Packet-Based Multimedia Communication Systems. International Telecommunication Union. February 1998.

ITU-T H.231: Multipoint Control Units for Audiovisual Systems Using Digital Channels up to 2 Mbit/s. March 1993.

Extensible Markup Language (XML) 1.0 (Second Edition).

W3C Recommendation 6 Oct. 2000.

http://www.w3.org/TR/REC-xml.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method for non-causal speaker selection, comprising:
   receiving a plurality of video streams at a multipoint control unit, each of the plurality of video streams being associated with a respective endpoint of a multipoint conference;
   receiving a plurality of audio streams at the multipoint control unit, each audio stream being associated with a respective one of the video streams;
   buffering the audio streams in respective audio buffers;
   buffering the video streams in respective video buffers;
   copying first video data from the video buffers to obtain a low latency video stream for distribution to active conference participants; and
   copying second video data from the video buffers to obtain a high latency video stream for distribution to passive conference participants, the high latency video stream being delayed in time with respect to the low latency video stream.

2. The method for non-causal speaker selection of claim 1, further comprising:
   copying first audio data from the audio buffers to obtain a low latency audio stream that corresponds to the low latency video stream;
   copying second audio data from the audio buffers to obtain a high latency audio stream that corresponds to the high latency video stream; and
   combining the first and second audio data with the first and second video data, respectively, for combined distribution to the active conference participants and the passive conference participants, respectively.

3. The method for non-causal speaker selection of claim 2, further comprising;
   using the first audio data to detect a new speaker; and
   switching the second video data based, at least in part, upon detection of the new speaker.

4. The method for non-causal speaker selection of claim 2, further comprising:
   removing the second video data from the video buffers at approximately a time at which the second video data is copied to obtain the high latency video streams.

5. The method for non-causal speaker selection of claim 2, wherein the low latency video stream comprises a first low latency video stream, and further comprising:
   copying third video data from the video buffers to obtain a second low latency video stream for distribution to a current speaker.

6. The method for non-causal speaker selection of claim 5, further comprising:
   copying third audio data from the audio buffers to obtain a second low latency audio stream that corresponds to the second low latency video stream; and
   combining the third audio data with the third video data, respectively, for distribution to the current speaker.

7. The method for non-causal speaker selection of claim 1, further comprising calculating current and previous speakers for a voice-activated switched multipoint conference by copying audio information from middle portions of each audio buffer in order to reduce hysteresis delay.

8. The method for non-causal speaker selection of claim 1, wherein each audio buffer includes a write pointer position, and further comprising:
   selecting a common buffer position of each audio buffer from which to copy audio data, using a point in time which corresponds to an oldest write pointer location among all audio buffers.

9. The method for non-causal speaker selection of claim 1, wherein an amount of video data that is buffered in the video buffers is dynamically varied in accordance with an amount of memory available to a voice-activated switch module of an MCU.

10. The method for non-causal speaker selection of claim 1, wherein each video buffer includes a respective read pointer, and further comprising:
   increasing an amount of video by moving ones of the read pointers that are associated with passive conference participants only.

11. The method for non-causal speaker selection of claim 1, wherein a video delay associated with the high latency video stream is greater than a hysteresis switching delay of the MCU.

12. A multipoint control unit, comprising:
   an interface being operable to receive a plurality of video streams at a multipoint control unit, each of the plurality of video streams being associated with a respective endpoint of a multipoint conference;
   the interface being further operable to receive a plurality of audio streams at the multipoint control unit, each audio stream being associated with a respective one of the video streams;
   memory being operable to buffer the audio streams in respective audio buffers;
   the memory being further operable to buffer the video streams in respective video buffers;
   a processor being operable to copy first video data from the video buffers to obtain a low latency video stream for distribution to active conference participants;
   the processor being further operable to copy second video data from the video buffers to obtain a high latency video stream for distribution to passive conference viewers, the high latency video stream being delayed in time with respect to the low latency video stream.

13. The multipoint control unit of claim 12, wherein the processor is further operable to:
   copy first audio data from the audio buffers to obtain a low latency audio stream that corresponds to the low latency video stream;
   copy second audio data from the audio buffers to obtain a high latency audio stream that corresponds to the high latency video stream;
   combine the first and second audio data with the first and second video data, respectively, for combined distribution to the active conference participants and the passive conference participants, respectively.

14. The multipoint control unit of claim 13, wherein the processor is further operable to use the first audio data to detect a new speaker, and switch the second video data based upon detection of the new speaker.

15. The multipoint control unit of claim 12, wherein the processor is further operable to remove the second video data from the video buffers at approximately a time at which the second video data is copied to obtain the high latency video stream.

16. The multipoint control unit of claim 12, wherein the low latency video stream comprises a first low latency video stream, and wherein the processor is further operable to copy third video data from the video buffers to obtain a second low latency video stream for distribution to a current speaker.

17. The multipoint control unit of claim 16, wherein the processor is further operable to:
   copy third audio data from the audio buffers to obtain a second low latency audio stream that corresponds to the second low latency video stream;
   combine the third audio data with the third video data, respectively, for distribution to the current speaker.

18. The multipoint control unit of claim 12, wherein the processor is further operable to determine current and previous speakers for a voice-activated switched multipoint conference using audio information copied from middle portions of each audio buffer in order to reduce hysteresis delay.

19. The multipoint control unit of claim 12, wherein each audio buffer includes a write pointer position, and wherein the processor is further operable to select a common buffer position of each audio buffer from which to copy audio data, using a point in time which corresponds to an oldest write pointer location among all audio buffers.

20. The multipoint control unit of claim 12, wherein an amount of video data that is buffered in the video buffers is dynamically varied in accordance with an amount of memory available to a voice-activated switch module of an MCU.

21. The multipoint control unit of claim 12, wherein each video buffer includes a respective read pointer, and wherein the processor is further operable to increase an amount of video by moving ones of the read pointers that are associated with passive conference participants only.

22. The multipoint control unit of claim 12, wherein a video delay associated with the high latency video stream is greater than a hysteresis switching delay of the MCU.

23. Logic encoded in media for non-causal speaker selection, the logic being operable to perform the following steps:
   receive a plurality of video streams at a multipoint control unit, each of the plurality of video streams being associated with a respective endpoint of a multipoint conference;
   receive a plurality of audio streams at the multipoint control unit, each audio stream being associated with a respective one of the video streams;
   buffer the audio streams in respective audio buffers;
   buffer the video streams in respective video buffers;
   copy first video data from the video buffers to obtain a low latency video stream for distribution to active conference participants; and
   copy second video data from the video buffers to obtain a high latency video stream for distribution to passive conference participants, the high latency video stream being delayed in time with respect to the low latency video stream.

24. The logic encoded in media of claim 23, wherein the logic is further operable to:
   copy first audio data from the audio buffers to obtain a low latency audio stream that corresponds to the low latency video stream;
   copy second audio data from the audio buffers to obtain a high latency audio stream that corresponds to the high latency video stream; and
   combine the first and second audio data with the first and second video data, respectively, for distribution to the active conference participants and the passive conference participants, respectively.

25. The logic encoded in media of claim 24, wherein the logic is further operable to:
   use the first audio data to detect a new speaker; and
   switch the second video data based upon detection of the new speaker.

26. The logic encoded in media of claim 24, wherein the logic is further operable to remove the second video data from the video buffers at approximately a time at which the second video data is copied to obtain the high latency video streams.

27. The logic encoded in media of claim 24, wherein the low latency video stream comprises a first low latency video stream, and wherein the logic is further operable to copy third video data from the video buffers to obtain a second low latency video stream for distribution to a current speaker.

28. The logic encoded in media of claim 27, wherein the logic is further operable to:
   copy third audio data from the audio buffers to obtain a second low latency audio stream that corresponds to the second low latency video stream; and
   combine the third audio data with the third video data, respectively, for distribution to the current speaker.

29. The logic encoded in media of claim 23, wherein the logic is further operable to calculate current and previous speakers for a voice-activated switched multipoint conference, by copying audio information from middle portions of each audio buffer, in order to reduce hysteresis delay.

30. A system for non-causal speaker selection, comprising:
   means for receiving a plurality of video streams at a multipoint control unit, each of the plurality of video streams being associated with a respective endpoint of a multipoint conference;
   means for receiving a plurality of audio streams at the multipoint control unit, each audio stream being associated with a respective one of the video streams;
   means for buffering the audio streams in respective audio buffers;
   means for buffering the video streams in respective video buffers;
   means for copying first video data from the video buffers to obtain a low latency video stream for distribution to active conference participants; and
   means for copying second video data from the video buffers to obtain a high latency video stream for distribution to passive conference participants, the high latency video steam being delayed in time with respect to the low latency video stream.

31. The system of claim 30, further comprising:
   means for copying first audio data from the audio buffers to obtain a low latency audio stream that corresponds to the low latency video streams;
   means for copying second audio data from the audio buffer to obtain a high latency audio stream that corresponds to the high latency video stream; and
   means for combining the first and second audio data with the first and second video data, respectively, for combined distribution to the active conference participants and the passive conference participants, respectively.

32. The system of claim 31, further comprising:
   means for using the first audio data to detect a new speaker; and
   means for switching the second video data based upon detection of the new speaker.

33. The system of claim 31, further comprising means for removing the second video data from the video buffers at approximately a time at which the second video data is copied to obtain the high latency video streams.

34. The system of claim 31, wherein the low latency video stream comprises a first low latency video stream, and further comprising means for copying third video data from the video buffers to obtain a second low latency video stream for distribution to a current speaker.

35. The system of claim 34, further comprising:
   means for copying third audio data from the audio buffers to obtain a second low latency audio stream that corresponds to the second low latency video stream; and
   means for combining the third audio data with the third video data, respectively, for distribution to the current speaker.

36. The system of claim 30, further comprising means for calculating current and previous speakers for a voice activated switched multipoint conference by copying audio information from middle portions of each audio buffer in order to reduce hysteresis delay.

* * * * *